United States Patent
Teranishi et al.

(10) Patent No.: US 12,406,057 B2
(45) Date of Patent: Sep. 2, 2025

(54) MACHINE LEARNING METHOD, MACHINE LEARNING SYSTEM, AND PROGRAM

(71) Applicant: NEC Corporation, Tokyo (JP)

(72) Inventors: Isamu Teranishi, Tokyo (JP); Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 382 days.

(21) Appl. No.: 17/922,037

(22) PCT Filed: May 13, 2020

(86) PCT No.: PCT/JP2020/019065
§ 371 (c)(1),
(2) Date: Oct. 28, 2022

(87) PCT Pub. No.: WO2021/229706
PCT Pub. Date: Nov. 18, 2021

(65) Prior Publication Data
US 2023/0214482 A1    Jul. 6, 2023

(51) Int. Cl.
*G06F 21/55* (2013.01)

(52) U.S. Cl.
CPC ................... *G06F 21/55* (2013.01)

(58) Field of Classification Search
CPC .......... G06F 21/55; G06F 21/62; G06N 20/00
See application file for complete search history.

(56) References Cited

U.S. PATENT DOCUMENTS

| 10,225,277 B1 * | 3/2019 | Shintre ............... G06F 21/6254 |
| 12,182,263 B2 * | 12/2024 | Sinn ...................... G06F 21/554 |
| 2018/0101770 A1 | 4/2018 | Tanaka et al. |
| 2019/0087730 A1 | 3/2019 | Saito |

FOREIGN PATENT DOCUMENTS

| JP | H07-121375 A | 5/1995 |
| JP | 2018-063504 A | 4/2018 |

(Continued)

OTHER PUBLICATIONS

Md Atiqur Rahman, Tanzila Rahman, Robert Lagani'ere, Noman Mohammed, Yang Wang; Membership Inference Attack against Differentially Private Deep Learning Model; (Year: 2017).*

(Continued)

*Primary Examiner* — Mohammed Waliullah

(57) ABSTRACT

The invention includes a first learning phase that a machine learning is performed using first dataset to create a learning model f; and a second learning phase that the first or a second dataset is randomly selected; a result by inputting the first and the second datasets to the learning model f is inputted to a discriminator h having a parameter ω; a machine learning is performed using a result and a ground truth data to train the parameter ω, the result being obtained by having the discriminator h discriminate whether the input data belongs to the first or the second dataset; and when the first dataset is selected, a result by inputting the data of the first dataset to the learning model f is inputted to a defender u to train a parameter τ thereof by using an output of the discriminator h through the defender u.

19 Claims, 11 Drawing Sheets

(56) References Cited

FOREIGN PATENT DOCUMENTS

| | | |
|---|---|---|
| JP | 2019-056975 A | 4/2019 |
| JP | 2020-025779 A | 2/2020 |

OTHER PUBLICATIONS

Reza Shokri, Marco Stronati, Congzheng Song, Vitaly Shmatikov; Membership Inference Attacks Against Machine Learning Models; IEEE (Year: 2017).*
International Search Report for PCT Application No. PCT/JP2020/019065, mailed on Aug. 11, 2020.
R.Shokri et al., "Membership Inference Attacks Against Machine Learning Models," IEEE Symposium on Security and Privacy, 2017, 3-18 <URL: https://arxiv.org/pdf/1610.05820.pdf>.
A.Salem et al., "ML-Leaks: Model and Data Independent Membership Inference Attacks and Defenses on Machine Learning Models", Dec. 14, 2018 <URL: https://arxiv.org/abs/1806.01246>.
M.Nasr et al., "Machine Learning with Membership Privacy using Adversarial Regularization", Jul. 16, 2018 <URL: https://arxiv.org/pdf/1807.05852.pdf>.
J.Jia et al., "MemGuard: Defending against Black-Box Membership Inference Attacks via Adversarial Examples", Dec. 18, 2019 <URL: https://arxiv.org/pdf/1909.10594.pdf>.
Y.Iwasawa et al., "Similarity Learning Based Adversarial Training for Censoring Representations", The 32nd Annual Conference of the Japanese Society for Artificial Intelligence 2018.

* cited by examiner

MACHINE LEARNING METHOD, MACHINE LEARNING SYSTEM, AND PROGRAM

This application is a National Stage Entry of PCT/JP2020/019065 filed on May 13, 2020, the contents of all of which are incorporated herein by reference, in their entirety.

FIELD

The present invention relates to a machine learning method, a machine learning system, and a program.

BACKGROUND

Membership inference attacks (MI attacks) that leak confidential information (for instance, customer information, trade secrets, etc.) used for training from learned parameters of machine learning are known (refer to Non-Patent Literatures (NPLs) 1 and 2). For instance, NPL 1 discloses a method for launching an MI attack under the condition that access to an inference algorithm is possible. The MI attack utilizes a phenomenon called "overfitting" in machine learning. Overfitting is a phenomenon in which a machine learning overfits to data used for training, and thereby the output tendency of an inference algorithm may differ when data that was used for training is inputted thereto from when data that was not used for training is inputted thereto. An attacker engaging in the MI attack maliciously exploits this difference in tendency, thereby determining whether or not the data at hand is used for training.

NPL 3 proposes a learning algorithm resistant to the MI attack. More concretely, NPL 3 adopts a method for increasing the inference accuracy of any known machine learning inference algorithm f and the resistance thereof to the MI attack, in which each parameter is trained adversarially using the inference algorithm f and a discriminator h that determines whether or not input data to f is used to train f.

NPL 4 discloses a method called MemGuard that misleads the attacker's discriminator as a defense against black-box attacks under the condition that a learned parameter of the inference algorithm under attack is unknown.

Patent Literature (PTL) 1 discloses a method in which the generation of data unfavorable to a user can be suppressed in a generative model learning method that generates data similar to training data using an adversarial network.

PTL 1: Japanese Patent Kokai Publication No. JP2018-63504A

NPL 1: Reza Shokri, Marco Stronati, Congzheng Song, Vitaly Shmatikov, "Membership Inference Attacks Against Machine Learning Models," IEEE Symposium on Security and Privacy, 2017, 3-18, [online], [retrieved on Apr. 9, 2020], the Internet <URL: https://arxiv.org/pdf/1610.05820.pdf>

NPL 2: Ahmed Salem, Yang Zhang, Mathias Humbert, Pascal Berrang, Mario Fritz, Michael Backes, "ML-Leaks: Model and Data Independent Membership Inference Attacks and Defenses on Machine Learning Models," [online], [retrieved on Apr. 9, 2020], the Internet <URL: https://arxiv.org/abs/1806.01246>

NPL 3: Milad Nasr, Reza Shokri, Amir Houmansadr, "Machine Learning with Membership Privacy using Adversarial Regularization," [online], [retrieved on Apr. 9, 2020], the Internet <URL: https://arxiv.org/pdf/1807.05852.pdf>

NPL 4: Jinyuan Jia, Ahmed Salem, Michael Backes, Yang Zhang, Neil Zhenqiang Gong, "MemGuard: Defending against Black-Box Membership Inference Attacks via Adversarial Examples," [online], [retrieved on Apr. 9, 2020], the Internet <URL: https://arxiv.org/pdf/1909.10594.pdf>

SUMMARY

The following analysis is given by the inventor of the present invention. A method for updating parameters θ of an inference algorithm in a method of NPL 3 as a defense against the MI attack is understood as the min-max optimization problem of the following [Math. 1] (refer to Math. (7) on page 5 of NPL 3).

$$\underbrace{\min_{f} \Big( L_D(f) + \lambda \underbrace{\max_{h} G_{f,D,D'}(h)}_{\text{optimal inference}} \Big)}_{\text{optimal privacy-preserving classification}} \quad [\text{Math. 1}]$$

Here, the "optimal inference" term in [Math. 1] represents maximizing a performance (gain G) of a discriminator h given an inference algorithm f. Further, LD (f) in the parentheses of [Math. 1] represents an EEmpirical Loss obtained by passing arbitrary data belonging to a dataset into a loss function in the inference algorithm f. The "optimal privacy-preserving classification" of the entire [Math. 1] represents searching for optimal parameters of the inference algorithm f, given the discriminator h having the required gain G. In other words, [Math. 1] shows that there is a trade-off between an accuracy and an attack resistance of the inference algorithm f, and λ is a parameter controlling a balance of the trade-off.

Therefore, in the method of NPL 3, increasing the parameter λ of [Math. 1], thereby prioritizing the performance (gain G) of the discriminator h, will sacrifice the accuracy of the inference algorithm f to some extent.

Further, since the method of NPL 4 creates a defense mechanism by adding noise to an inference result, it has a problem that the noise affects the inference result regardless of a performance of the defense mechanism.

It is an object of the present invention to provide a machine learning method, a machine learning system, and a program capable of contributing to improving both the performance of the defense against the MI attack and the accuracy of an inference algorithm described above to satisfy required levels.

According to a first aspect, there is provided a machine learning method comprising:
a first learning phase in which a machine learning is performed using first dataset with a teacher label as training data to create a learning model f having a parameter θ; and
a second learning phase in which
the first dataset or a second dataset is randomly selected;
a result obtained by inputting data of the first dataset and the second dataset to the learning model f is inputted to a discriminator h having a parameter ω as an input data;
a machine learning is performed using a result and a ground truth data to train the parameter ω of the discriminator h, the result being obtained by having the discriminator h discriminate whether the input data belongs to the first dataset or the second dataset; and
when the first dataset is selected, a result obtained by inputting the data of the first dataset to the learning model f is inputted to a defender u having a parameter τ that modifies an output of the learning model f to train the parameter τ of the defender u by using an output of the discriminator h that has passed through the defender u.

This method is associated with a particular machine referred to as a computer that receives training data as input and updates the learning model f.

According to a second aspect, there is provided a machine learning system comprising a control part capable of executing:

a first learning phase in which a machine learning is performed using a first dataset with a teacher label as training data to create a learning model f having a parameter θ; and a second learning phase in which the first dataset or a second dataset is randomly selected; a result obtained by inputting data of the first dataset and the second dataset to the learning model f is inputted to a discriminator h having a parameter ω as an input data;

a machine learning is performed using a result and a ground truth data to train the parameter ω of the discriminator h, the result being obtained by having the discriminator h discriminate whether the input data belongs to the first dataset or the second dataset; and when the first dataset is selected, a result obtained by inputting the data of the first dataset to the learning model f is inputted to a defender u having a parameter τ that modifies an output of the learning model f to train the parameter τ of the defender u by using an output of the discriminator h that has passed through the defender u.

According to a third aspect, there is provided a computer program for realizing the functions of the computer. The program is supplied to a computer apparatus using an input device or from the outside via a communication interface, is stored in a storage device, operates a processor according to predetermined steps or processes, is capable of displaying the processing results thereof including an intermediate state as necessary via a display device step by step, or is able to communicate with the outside via the communication interface. For instance, the computer apparatus for this purpose comprises a processor, a storage device, an input device, a communication interface and a display device, if necessary, that can typically be connected to each other by a bus. Further, this program can be stored in a computer-readable (non-transitory) storage medium.

According to the present invention, it becomes possible to contribute to the execution of machine learning in which both the performance of the defense against the MI attack and the accuracy of an inference algorithm described above are improved to satisfy the required levels.

EXAMPLE EMBODIMENT

First Example Embodiment

Figure 1:
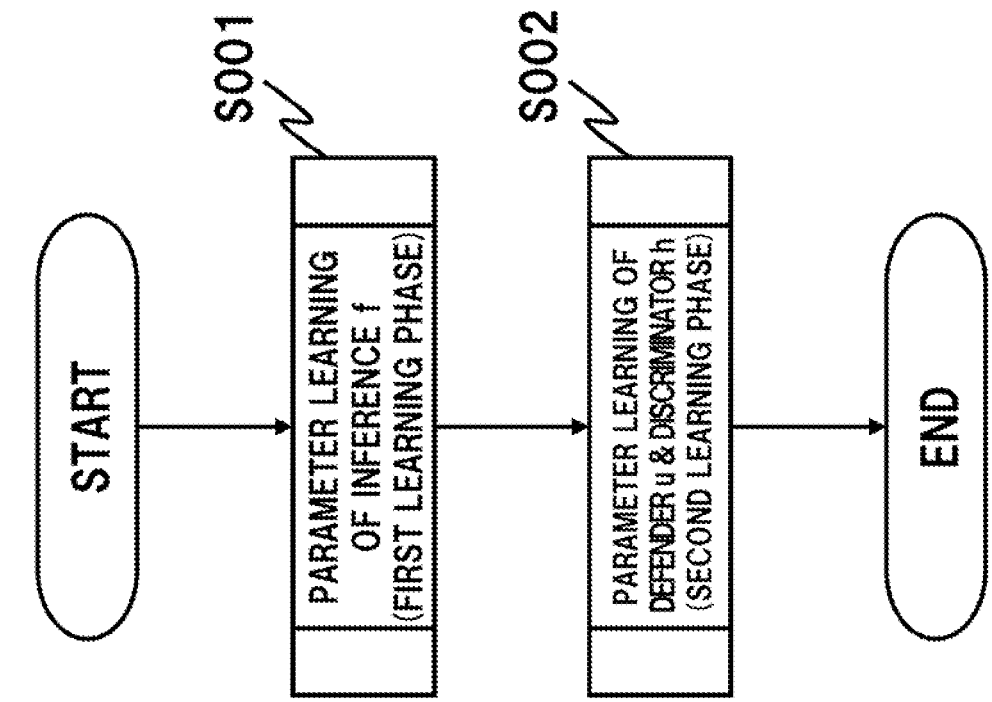
FIG. 1 is a flowchart showing the flow of a machine learning method according to a first example embodiment of the present invention.

First, an outline of a first example embodiment of the present invention will be given with reference to drawings. It should be noted that the drawing reference signs in the outline are given to each element for convenience as an example to facilitate understanding and are not intended to limit the present invention to the illustrated aspects. Further, connection lines between blocks in the drawings referred to in the following description can be both bidirectional and unidirectional. A unidirectional arrow schematically shows the main flow of a signal (data) and does not exclude bidirectionality. A program is executed by a computer apparatus, and the computer apparatus comprises, for instance, a processor, storage device, input device, communication interface, and a display device as necessary. Further, the computer apparatus is configured to be able to execute wired or wireless communication with an internal device therein or with an external device (including a computer) via the communication interface. Although the input/output connection points of each block in the drawings have ports or interfaces, these are not illustrated. Further, in the following description, "A and/or B" means at least one of A and B.

FIG. 1 is a flowchart showing a flow of a machine learning method according to the first example embodiment. As shown in FIG. 1, the machine learning method according to the first example embodiment is configured as a machine learning method that trains a parameter of a learning model f (referred to as a "inference f" hereinafter) and parameters of a defender u and a discriminator h by executing a first learning phase and a second learning phase, respectively. These phases can be configured by using a convolutional neural network ("CNN" hereinafter), and each parameter corresponds to a weight or a bias used in a convolutional layer or a fully connected layer constituting the CNN.

Figure 2:
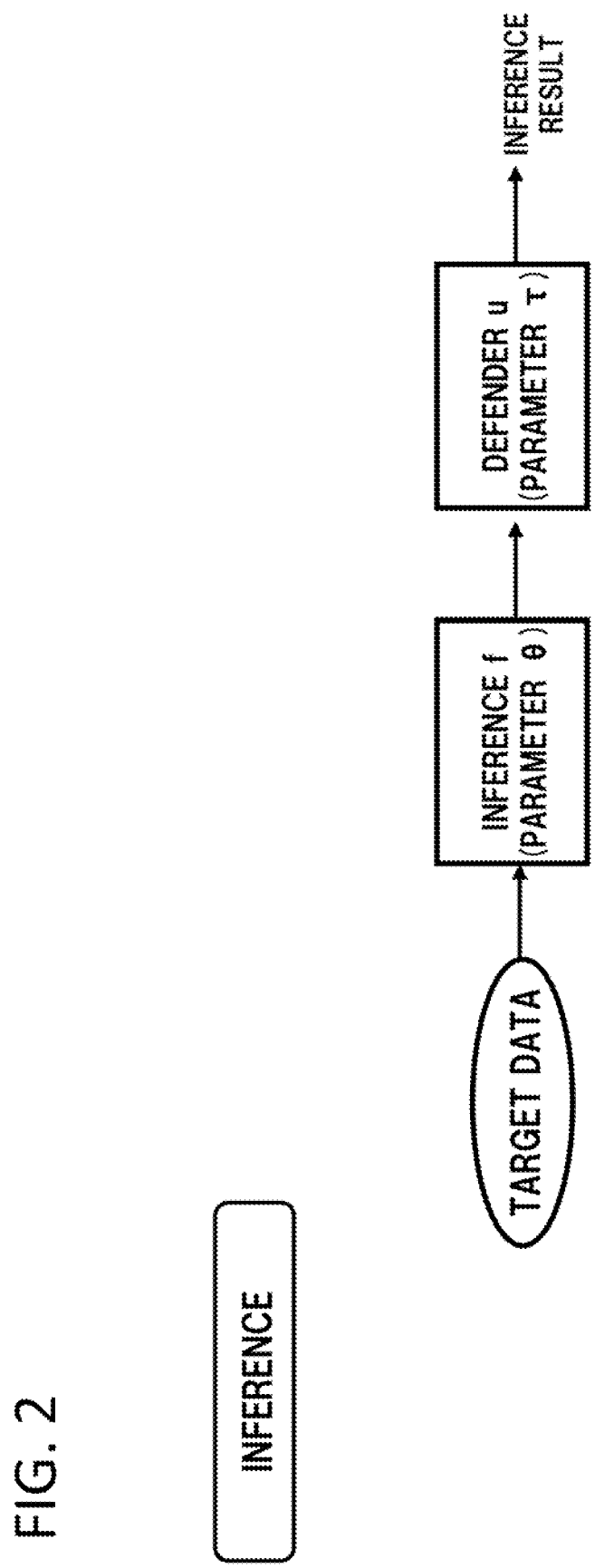
FIG. 2 is a drawing for explaining a detail of an inference phase of the first example embodiment of the present invention.

FIG. 2 is a drawing illustrating an inference phase using the inference f and the defender u. When inference target data is inputted, the inference f outputs an inference result with respect to the target data. The defender u modifies an output of the inference f so that an inference result of the inference f on training data used to train the inference f and an inference result thereof on data not used to train the inference f are indistinguishable. As a result, for an attacker who tries to infer the parameter of the inference f from a result obtained by inputting arbitrary data into the inference f, it becomes difficult to extract meaningful information about the training data from arbitrary data. Ultimately, this can make it difficult for the attacker to infer the parameter of the inference f.

Figure 3:
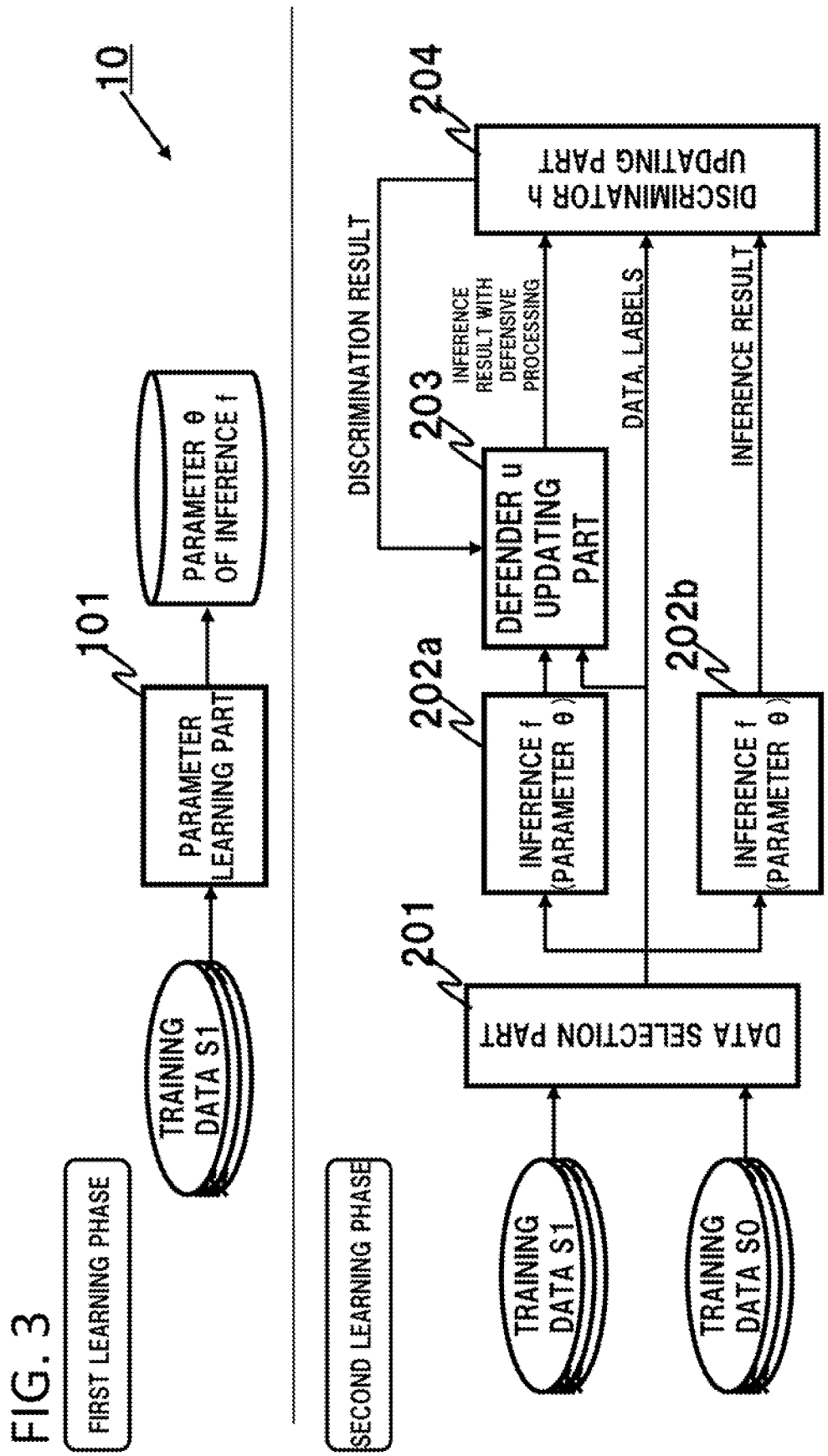
FIG. 3 is a drawing for explaining a detail of each inference phase of the first example embodiment of the present invention.

With reference to FIG. 3, following describes in detail how a machine learning system 10 according to the present example embodiment trains the parameters of the inference f, the defender u, and the discriminator h having the properties described above.

[First Learning Phase]

In the first learning phase, a parameter θ of the inference f is trained by machine learning using training data S1 created in advance by attaching a teacher label (simply referred to as a "label" hereinafter) to arbitrary data (refer to a parameter learning part 101). Since there is no need to consider the defense performance against an MI attack when training the parameter θ of the inference f, it is possible to pursue accuracy using the training data S1.

[Second Learning Phase]

In the second learning phase, a data selection part 201 randomly selects training data from the training data S1 and training data S0, which is different from the training data S1. The training data S1 corresponds to data called "members" in an MI attack, and the training data S0 corresponds to data called "non-members" therein.

When selecting the training data S1, the data selection part 201 inputs the training data S1 to an inference f 202a and makes the output of the inference f 202a go through a defender u updating part 203.

When selecting the training data S0, the data selection part 201 inputs the training data S0 to an inference f 202b and makes the output of the inference f 202b go directly to a discriminator h updating part 204.

Further, regardless of whether the training data S1 or S0 is selected, the data selection part 201 inputs the selected data and labels to both the defender u updating part 203 and the discriminator h updating part 204.

When the training data is inputted, each of the inferences f 202a and 202b outputs an inference result. It should be noted that, in the inferences f 202a and 202b, the same parameter θ, which has trained in the first learning phase, is set. FIG. 3 shows each of the inference f 202a and the inference f 202b as an independent processing block to simplify the description, they may be configured as a common processing block.

The defender u updating part 203 holds the defender u that modifies an inference result from the inference f 202a so that the discriminator h held in the discriminator h updating part 204 cannot distinguish between the training data S1 and S0, and outputs the modified inference result to the discriminator h updating part 204. For instance, the inference f 202a may output an exceptionally high inference result for some data belonging to the training data S1. In this case, the defender u modifies the output of the inference f 202a so that it is not possible to distinguish if the output is from the data belonging to the training data S1 or the training data S0. Further, the defender u updating part 203 updates the parameter of the defender u using a discrimination result at the discriminator h updating part 204 and the ground truth data (the data and the labels) received from the data selection part 201.

When receiving an inference result of the output of the inference f 202a via the defender u or an inference result of the output of the inference f 202b, the discriminator h updating part 204 discriminates whether the received inference result is the inference result from the training data S1 or S0, and outputs the discrimination result to the defender u updating part 203. Further, the discriminator h updating part 204 updates the parameter of the discriminator h using its own discrimination result with respect to the received inference result and the ground truth data (the data and the labels) received from the data selection part 201.

Therefore, the defender u updating part 203 and the discriminator h updating part 204 perform so-called adversarial learning, updating the respective parameters of the defender u and discriminator h, and improve the performance thereof. As a result, it is possible to obtain the defender u having high defense performance that makes it difficult to distinguish between the output of the inference f 202a going through the defender u and the output of the inference f 202b without going through the defender.

[Inference]

As shown in FIG. 2, an inference result can be obtained by inputting real data (target data) to the inference f obtained in the first learning phase and then inputting the output thereof to the defender u obtained in the second learning phase. As described above, the accurate parameter θ is set in the inference f trained using the training data S1 without consideration to security (the defense performance against MI attacks). Meanwhile, the defender u has parameters that can ensure a security of the training data S1 (the defense performance against MI attacks) when the training data S1 is inputted to the inference f. Therefore, according to the present example embodiment, it is possible to build an inference system with improved accuracy and security (the defense performance against MI attacks).

Second Example Embodiment

Figure 4:
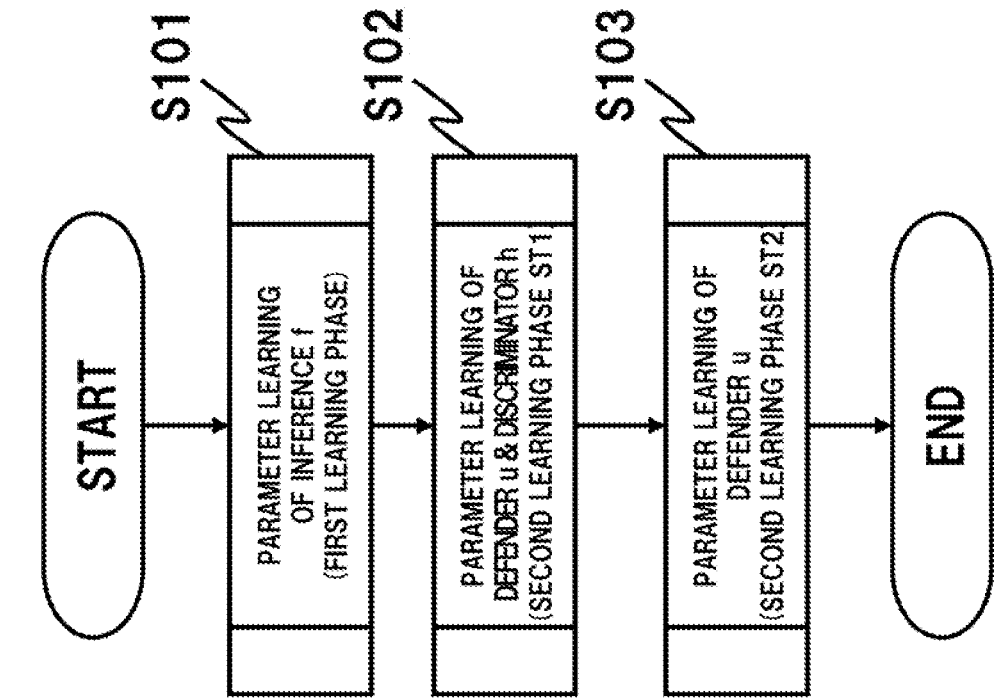
FIG. 4 is a flowchart showing the flow of a machine learning method according to a second example embodiment of the present invention.

Next, the following describes a second example embodiment in which a step of increasing the performance of the defender u is added to the second learning phase of the first example embodiment described above. FIG. 4 is a flowchart showing the flow of a machine learning method according to the second example embodiment of the present invention. The second example embodiment differs from the first example embodiment shown in FIG. 1 in that step ST2 (S103) is added to the second learning phase. Besides this, the second example embodiment is configured in the same manner as the first example embodiment, therefore differences will be mainly described below.

[Second Learning Phase]

Figure 5:
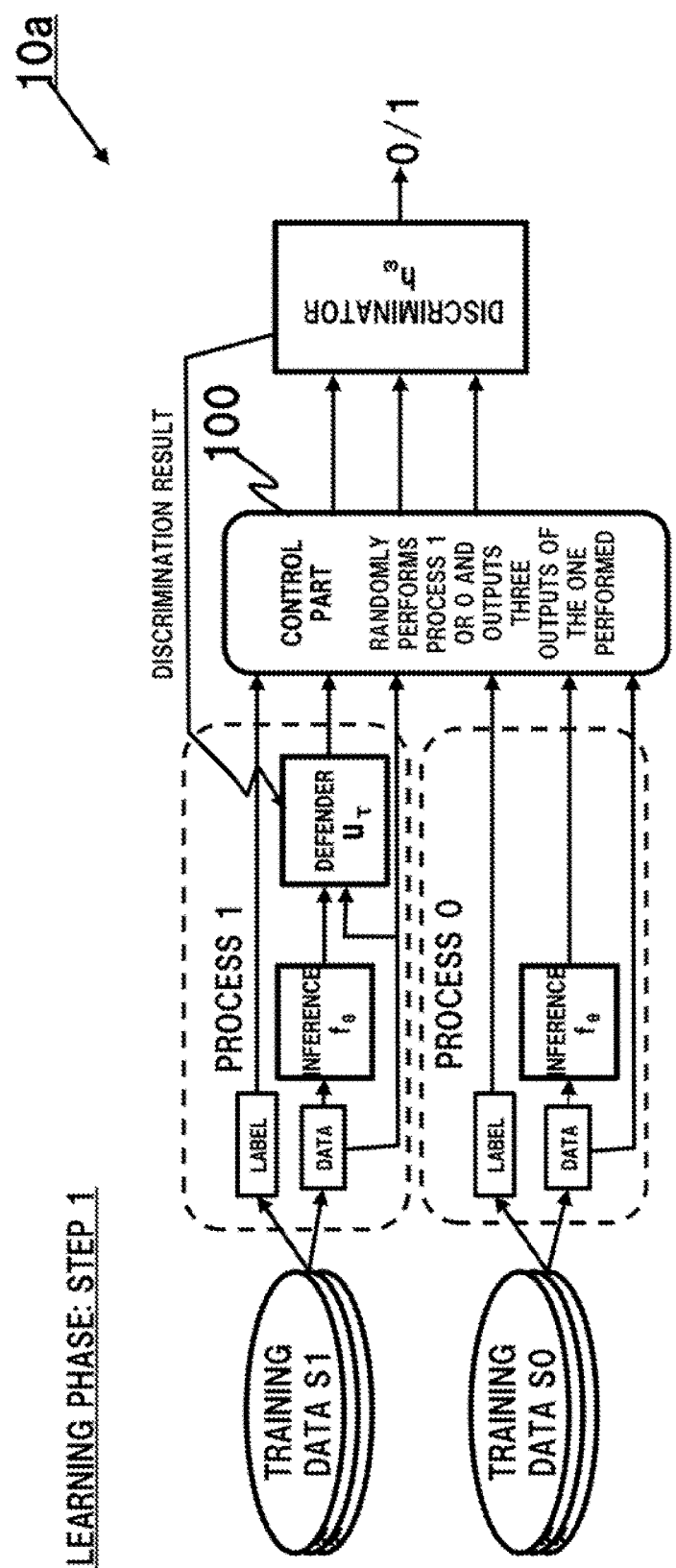
FIG. 5 is a drawing for explaining a detail of step ST1 of a second learning phase according to the second example embodiment of the present invention.

FIG. 5 is a drawing for explaining a detail of step ST1, performed by a machine learning system 10a of the present example embodiment, of the second learning phase according to the second example embodiment. The step ST1 of the second learning phase according to the second example embodiment is the same as the second learning phase of the first example embodiment, but this step will be described in more detail, including an algorithm and the like.

[Step ST1 of the Second Learning Phase]

A control part 100 sequentially performs each process shown in FIG. 5. First, the control part 100 randomly selects from a labeled training data S1 or a labeled training data S0, each labeled respectively. Here, the training data S1 was used to train the inference f in the first learning phase whereas the training data S0 was not used to train the inference f in the first learning phase.

If the training data S1 is selected, the control part 100 performs a process 1 in FIG. 5. More concretely, the control part 100 extracts a label and data, and inputs the data to an inference $f_θ$ and a defender $u_τ$. Hereinafter, the inference $f_θ$ denotes an inference having a parameter θ; the defender $u_τ$ denotes a defender having a parameter τ; and a discriminator $h_ω$ denotes a discriminator having a parameter ω.

The inference $f_\theta$ computes an inference result for the training data S1 inputted thereto. The inference result from the inference $f_\theta$ is inputted to the defender $u_\tau$.

For the inference result from the inference $f_\theta$, the defender $u_\tau$ performs defensive processing that modifies the inference result so that it is indistinguishable from an inference result when the training data S0 is inputted to the inference $f_\theta$.

If the training data S0 is selected, the control part 100 performs a process 0 in FIG. 5. More concretely, the control part 100 extracts a label and data, and inputs the data to the inference $f_\theta$.

The inference $f_\theta$ computes an inference result for the training data S0 inputted thereto.

By executing the process 1 or 0 described above, it is possible to obtain an inference result of the training data S1 that has gone through the defender $u_\tau$ or an inference result of the training data S0, in addition to the labels and the data. The control part 100 inputs these three sets of data to the discriminator $h_\omega$ and makes it discriminate whether the inference target data is the training data S1 used to train the inference $f_\theta$ or the training data S0 not used to train the inference $f_\theta$.

Using this discrimination result and the ground truth data (the data and the labels), the control part 100 updates the parameter ω of the discriminator $h_\omega$. Further, the control part 100 updates the parameter τ of the defender $u_\tau$ using the discrimination result at the discriminator $h_\omega$ and the ground truth data (the data and the labels).

The control part 100 updates the parameter ω of the discriminator $h_\omega$ and the parameter τ of the defender $u_\tau$ by repeating the above processing a predetermined number of times. This processing can be achieved by the following algorithm.

(1): Receive a predetermined number of sets of the training data S1 and the training data S0 as input.

(2): Repeat (10) and (20) below $l_1$ times. Here, $l_1$, $k_h$, $m_h$, $k_u$, and $m_u$ are predetermined constants.

(10): Repeat (11) to (13) below $k_h$ times.

(11): From the training data S0, randomly select $m_h$ pairs of data and the labels thereof $(x_1, y_1), \ldots, (x_{mh}, y_{mh})$.

(12): From the training data S1, randomly select $m_h$ pairs of data and the labels thereof $(x'_1, y'_1), \ldots, (x'_{mh}, y'_{mh})$.

(13): Update ω in a direction that a value of following [Math. 2] increases. Note that ∇ in [Math. 2] and [Math. 3] below denotes the nabla operator (=the derivative for each component).

$$\frac{1}{m_h} \nabla_\omega \sum_{i=1}^{m_h} (\log h_\omega(x_i, y_i, f_\theta(x_i)) + \log(1 - h_\omega(x'_i, y'_i, u_\tau(x'_i, f_\theta(x'_i))))) \quad \text{[Math. 2]}$$

(20): Repeat (21) and (22) below $k_u$ times.

(21): From the training data S1, randomly select $m_u$ pairs of data and the labels thereof $(x'_1, y'_1), \ldots, (x'_{mu}, y'_{mu})$.

(22): Update τ in a direction that a value of following [Math. 3] decreases.

$$\frac{1}{m_u} \nabla_\tau \sum_{i=1}^{m_u} \log(1 - h_\omega(x'_i, y'_i, u_\tau(x'_i, f_\theta(x'_i)))) \quad \text{[Math. 3]}$$

(3): Output ω and τ obtained by performing the above (10) and (20) $l_1$ times.

By performing the step ST1 of the second learning phase described above, the parameter ω of the discriminator $h_\omega$ and the parameter τ of the defender $u_\tau$ are updated.

[Step ST2 of the Second Learning Phase]

Figure 6:
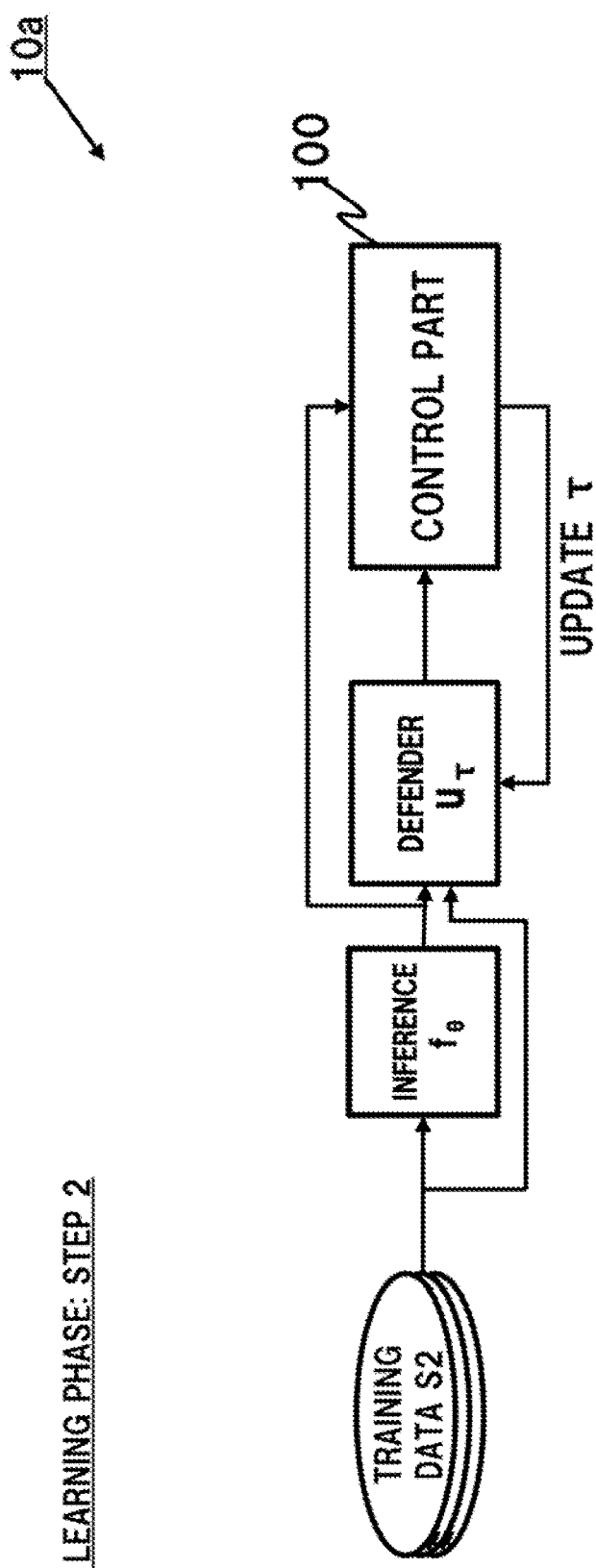
FIG. 6 is a drawing for explaining a detail of step ST2 of the second learning phase according to the second example embodiment of the present invention.

FIG. 6 is a drawing for explaining the details of the step ST2 of the second learning phase according to the second example embodiment of the present invention. In the second example embodiment, a machine learning below is additionally performed for the defender $u_\tau$ having the parameter τ as described above.

As shown in FIG. 6, first, training data S2 is prepared. The training data S2 may be any data different from the training data S1. For instance, it may be the training data S0 used in the step ST1 of the second learning phase. Further, the training data S2 may not have any label attached.

The control part 100 inputs such training data S2 to the inference $f_\theta$ having the parameter θ updated in the first learning phase and obtains the output result.

Then, the control part 100 inputs the output of the inference $f_\theta$ and the training data S2 to the defender $u_\tau$ described above, and further updates the parameter τ of the defender $u_\tau$ so that the defender $u_\tau$ outputs the output of the inference $f_\theta$ as it is when the training data S2 is inputted to the inference $f_\theta$. This processing can be achieved by the following algorithm.

(4): Receive a predetermined number of sets of the training data S2 (labels are unnecessary) as input.

(5): Repeat (30) below $l_2$ times. Here, $l_2$ and m are predetermined constants. Further, L denotes a predetermined loss function.

(30): Repeat (31) and (32) below $l_2$ times.

(31): From the training data S2, randomly select m sets of data $x_1, \ldots x_m$.

(32): Update τ in a direction that a value of following [Math. 4] decreases. Note that ∇ in [Math. 4] denotes the nabla operator (=the derivative for each component).

$$\frac{1}{m} \nabla_\tau L(u_\tau(x_i, f_\theta(x_i)), f_\theta(x_i)) \quad \text{[Math. 4]}$$

(6): Output τ obtained by performing the above (30) $l_2$ times.

By performing the step ST2 of the second learning phase described above, the parameter τ of the defender $u_\tau$ is further updated.

As a result of the above, it becomes difficult to distinguish the inference results of the following (a) to (c).

(a) Output from an inference $u_\tau f_\theta$ with the defender $u_\tau$, when the training data S1 used for training is inputted thereto.

(b) Output from the inference $f_\theta$ without the defender $u_\tau$, when the training data S0 not used for training is inputted thereto.

(c) Output from the inference $u_\tau f_\theta$ with the defender $u_\tau$, when the training data S0 not used for training is inputted thereto.

The first example embodiment makes it difficult to distinguish between (a) and (b) above. In the second example embodiment, the parameter τ of the defender $u_\tau$ is optimized so as to make it difficult to distinguish between (b) and (c) above by adding the step ST2 of the second learning phase. As a result, it is impossible to distinguish from the output of the inference $u_\tau f_\theta$ with the defender $u_\tau$ shown in FIG. 2 whether or not the source input of the inference result is the data used for training.

Further, in the present example embodiment, as explained in the first and the second learning phases, the configuration is employed that the inference $f_\theta$ is optimized until the required accuracy is obtained using the training data S1, and the inference $f_\theta$ is used as it is for machine learning of the defender $u_\tau$. Therefore, the inference accuracy of the inference $u_\tau f_\theta$ with the defender $u_\tau$ can be regarded as substantially the same as the inference accuracy of the inference $f_\theta$ without any defender for data not used for training. As described, with the present example embodiment, we have succeeded in ensuring an inference accuracy similar to that of a configuration without a defender. This is an advantage of the present example embodiment over the method of NPL 3 in which inference accuracy and security are in a trade-off relationship, as described in Background.

Further, compared with the method of NPL 4, since the present example embodiment updates the parameter $\tau$ so that the output of the inference $u_\tau f_\theta$ with the defender $u_\tau$ is the same as that of the inference $f_\theta$ without a defender unless the training data is inputted thereto, the inference result is not affected by noise. Further, in the method of NPL 4 since an exceptionally high score is outputted as a high score, albeit with noise, it is vulnerable to the attacks described in NPL 2. In contrast, in the present example embodiment, it is not possible to determine whether an inference result with an exceptionally high score is obtained from data used for training or data not used for training, as described above. Therefore, according to the present example embodiment security against the attacks described in NPL 2 is ensured.

Third Example Embodiment

Next, the following describes a third example embodiment in which an inference system equivalent to those of the first and the second example embodiments can be obtained by an approach different from the first and the second example embodiments.

Figure 7:
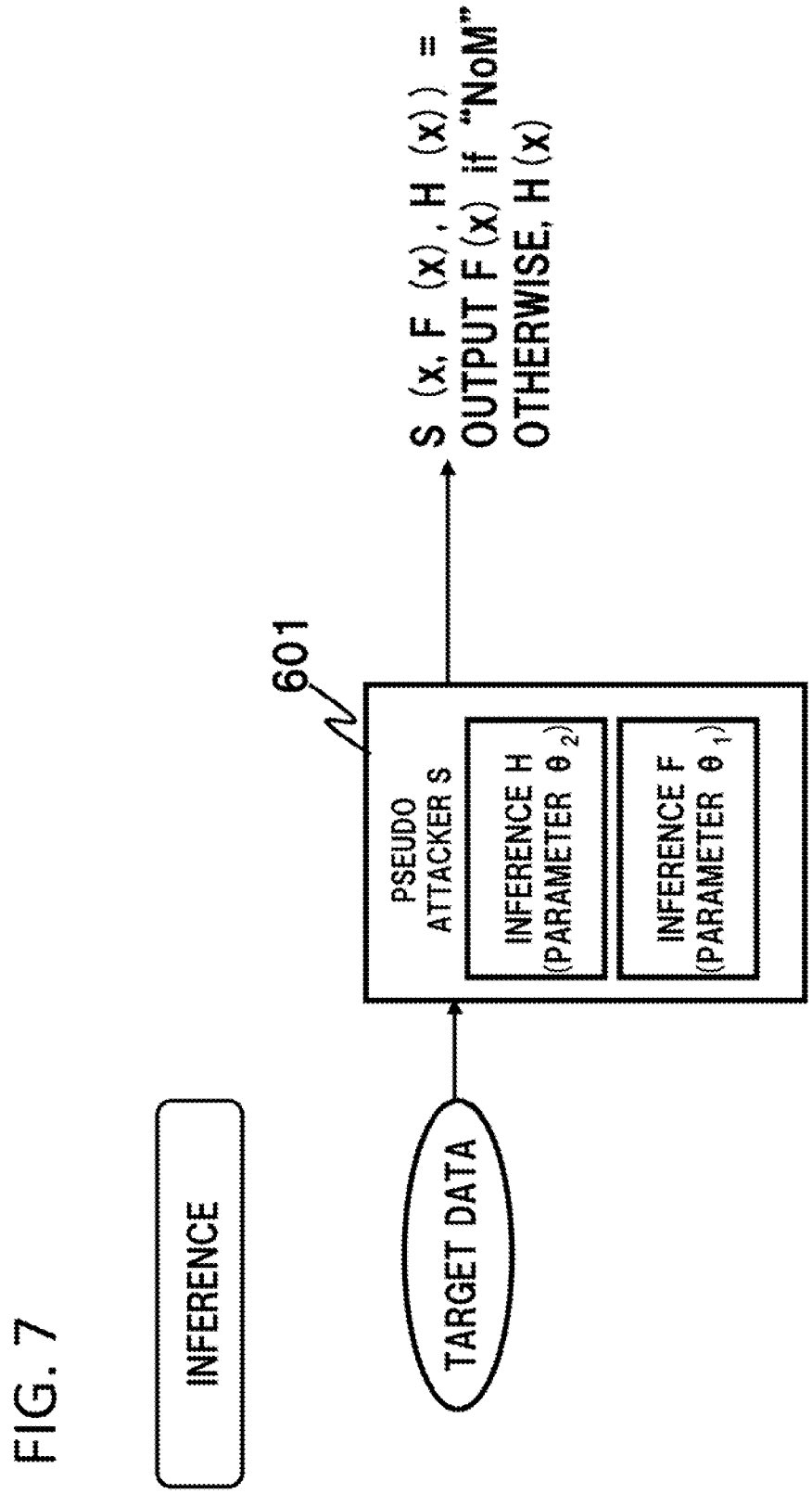
FIG. 7 is a drawing for explaining a detail of an inference phase of a third example embodiment of the present invention.

FIG. 7 shows the configuration of an inference system using a pseudo attacker S that selects from two different inferences F and H according to the input data, and outputs an inference result. The pseudo attacker S in FIG. 7 outputs an inference result for the input data by the inference F when determining that the input data is NoM, i.e., data not used to train the inference F, whereas the pseudo attacker S outputs an inference result for the input data by the inference H when determining that the input data is MeM, i.e., data used to train the inference F. According to the machine learning method of the present example embodiment, the inferences F and H that can achieve both inference accuracy and security are created in such a configuration. The method will be described in detail below.

Figure 8:
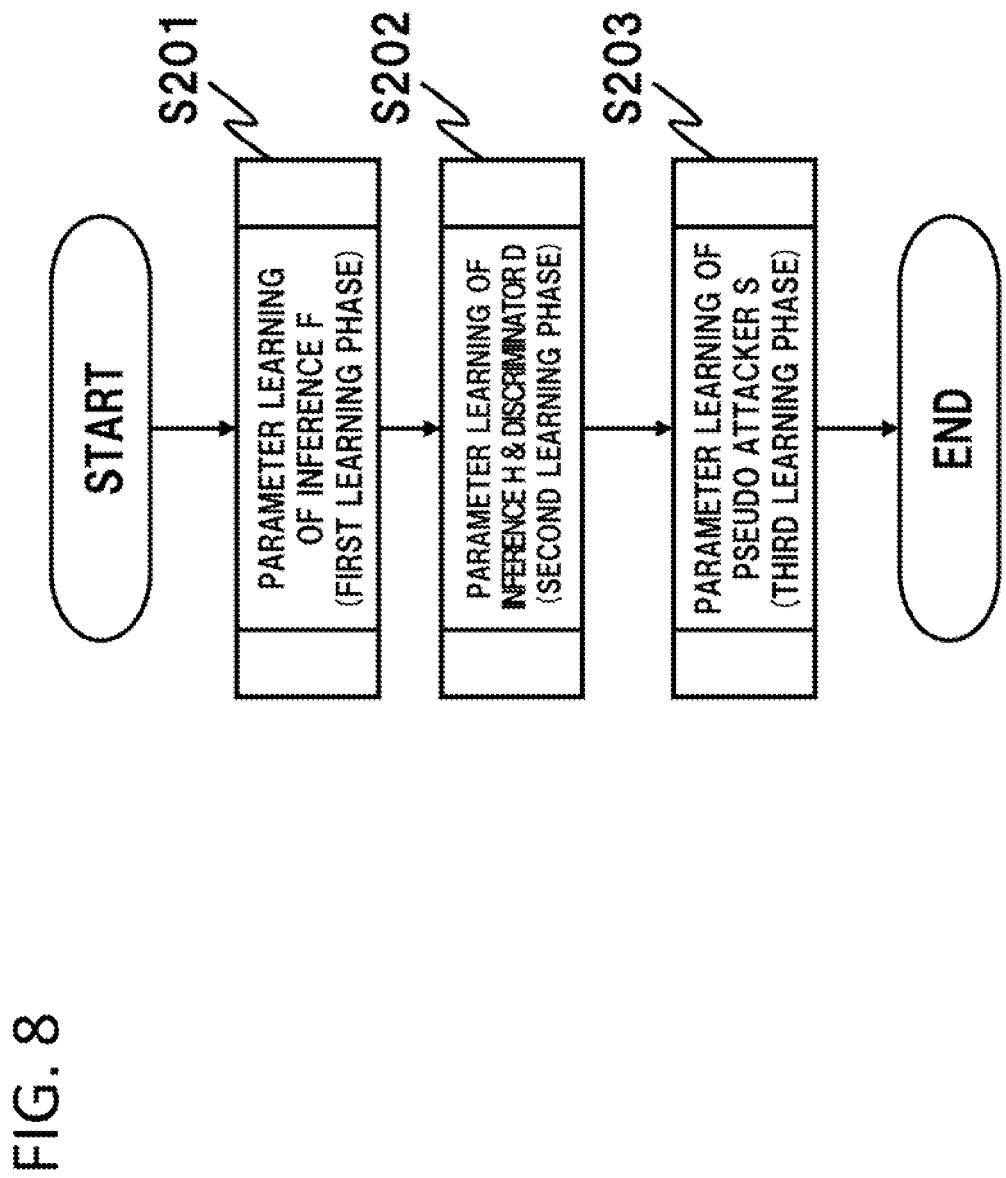
FIG. 8 is a flowchart showing the flow of a machine learning method according to the third example embodiment of the present invention.

FIG. 8 is a flowchart showing the flow of the machine learning method according to the third example embodiment. The machine learning method according to the third example embodiment is configured as a machine learning method that trains a parameter of the learning model F, parameters of the inference H and a discriminator D, and a parameter of the pseudo attacker S by performing a first learning phase, a second learning phase, and a third learning phase, respectively.

[First Learning Phase]

Figure 9:
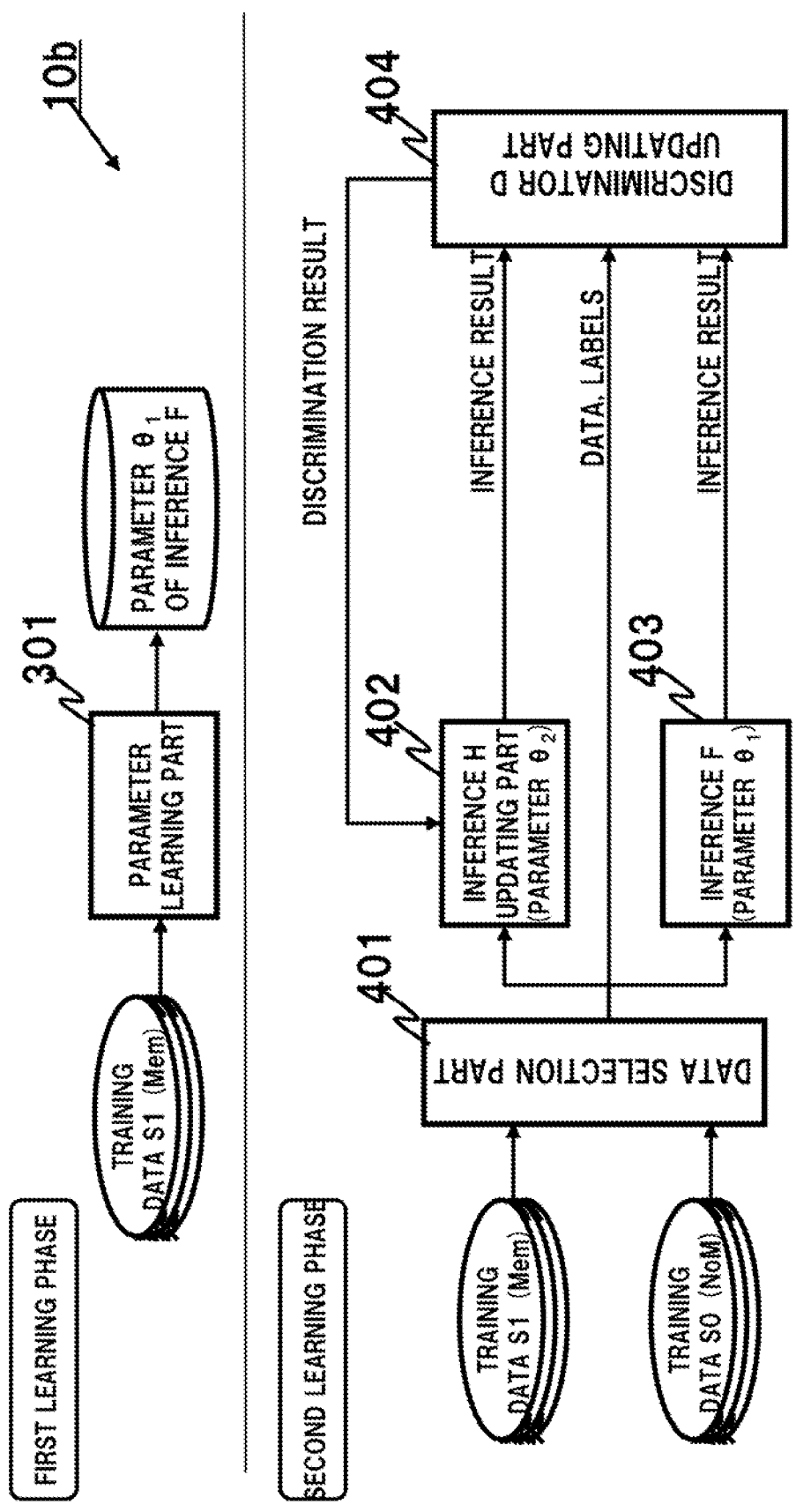
FIG. 9 is a drawing for explaining a detail of first and second learning phases according to the third example embodiment of the present invention.

FIG. 9 is a drawing for explaining details of the first learning phase and the second learning phase according to the third example embodiment, performed by a machine learning system 10b of the present example embodiment. In the first learning phase, a parameter $\theta_1$ of the inference F is trained by a machine learning using a training data S1 (Mem) created in advance by attaching a teacher label to arbitrary data (refer to a parameter learning part 301). Since there is no need to consider the defense performance against an MI attack when training the parameter $\theta 1$ of the inference F, it is possible to pursue accuracy using the training data S1 (Mem). In this regard, the third example embodiment is the same as the first and the second example embodiments.

[Second Learning Phase]

In the second learning phase, a data selection part 401 randomly selects training data from the training data S1 (Mem) and training data S0 (NoM), which is different from the training data S1. Here, "Mem" denotes members and "NoM" non-members.

When selecting the training data S1 (Mem), the data selection part 401 inputs the training data S1 (Mem) to an inference H updating part 402.

When selecting the training data S0 (NoM), the data selection part 401 inputs the training data S0 (NoM) to an inference F 403 having the parameter $\theta_1$ trained in the first learning phase.

Further, regardless of whether the training data S1 (Mem) or S0 (NoM) is selected, the data selection part 401 inputs the selected data and a label to a discriminator D updating part 404.

The inference H updating part 402 outputs an inference result for the input data obtained by the inference H, and updates a parameter $\theta_2$ of the inference H so that the discriminator D held in the discriminator D updating part 404 cannot distinguish between the training data S1 (Mem) and S0 (NoM). More concretely, the inference H updating part 402 updates the parameter $\theta_2$ of the inference H using a discrimination result at the discriminator D updating part 404 and the ground truth data (the data and the labels) received from the data selection part 401.

When receiving an inference result, either an output of the inference H updating part 402 or an output of the inference F 403, the discriminator D updating part 404 discriminates whether the received inference result is the inference result from the training data S1 (Mem) or S0 (NoM), and outputs the discrimination result to the inference H updating part 402. Further, the discriminator D updating part 404 updates a parameter of the discriminator D using its own discrimination result with respect to the received inference result and the ground truth data (the data and the labels) received from the data selection part 401.

Therefore, the inference H updating part 402 and the discriminator D updating part 404 perform so-called adversarial learning, updating the respective parameters of the inference H and discriminator D. As a result, it is possible to obtain the inference H having high defense performance that makes it difficult to distinguish between the output of the inference H and the output of the inference F 403.

[Third Learning Phase]

Figure 10:
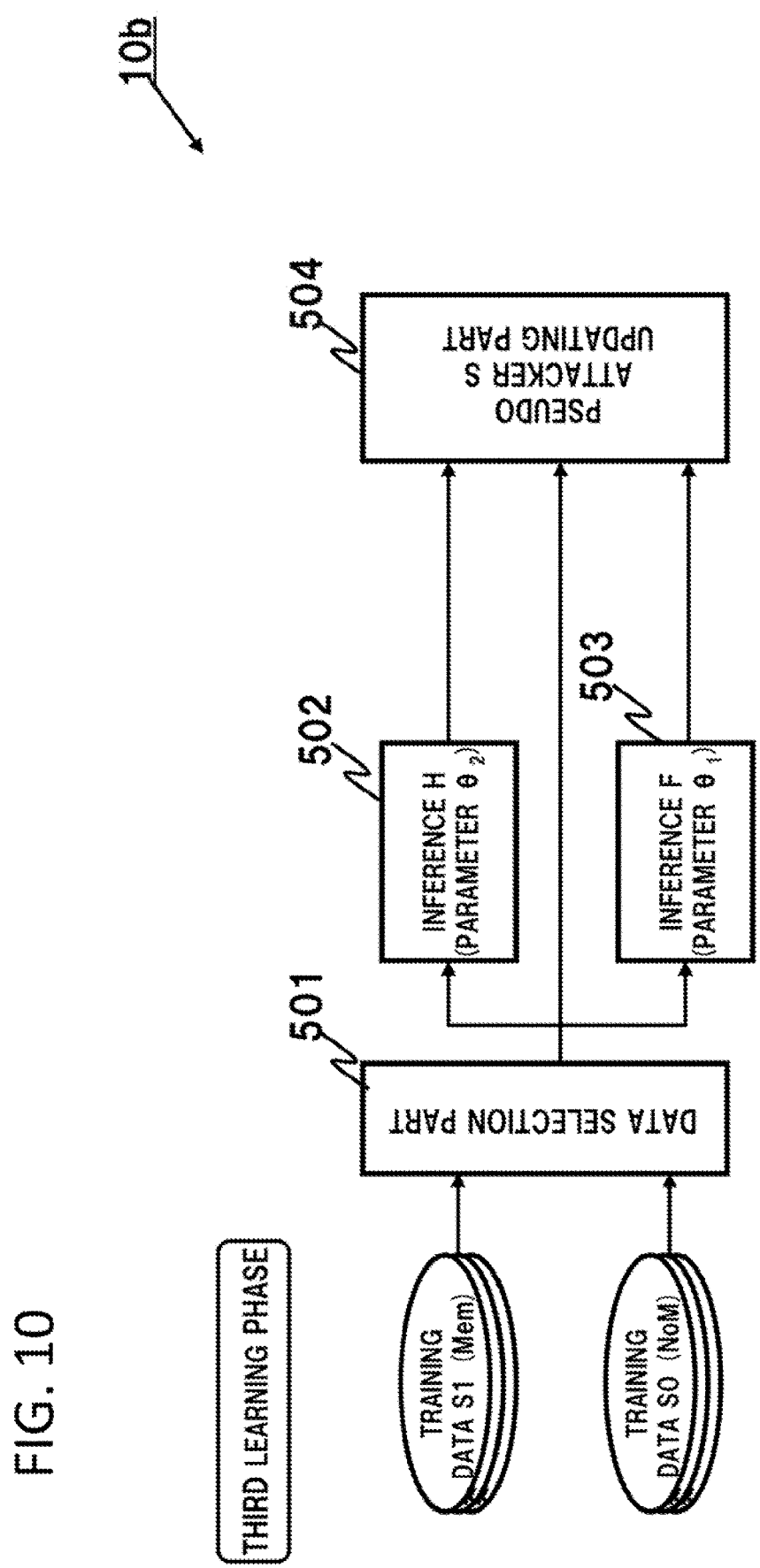
FIG. 10 is a drawing for explaining a detail of a third learning phase according to the third example embodiment of the present invention.

Next, a parameter of the pseudo attacker S used in the inference system are trained. FIG. 10 is a drawing for explaining the details of the third learning phase according to the third example embodiment of the present invention.

As shown in FIG. 10, in the third learning phase, a data selection part 501 randomly selects training data from the training data S1 (Mem) and the training data S0 (NoM) which is different from the training data S1. Further, the data selection part 501 sends the selected data as the ground truth data to a pseudo attacker S updating part 504.

When selecting the training data S1 (Mem), the data selection part 501 inputs the training data S1 (Mem) to an inference H 502 having the parameter $\theta_2$ trained in the step ST1 of the second learning phase.

When selecting the training data S0 (NoM), the data selection part 501 inputs the training data S0 (NoM) to an inference F 503 having the parameter $\theta_1$ trained in the first learning phase.

The pseudo attacker S updating part 504 receives an inference result from the inference H 502 to which the training data S1 (Mem) is inputted or an inference result from the inference F 503 to which the training data S0 (NoM) is inputted, and updates the parameters of the pseudo attacker S using the ground truth data inputted by the data selection part 501 so that the training data S1 (Mem) and the training data S0 (NoM) can be distinguished from the inference result.

As described above, the inference H 502, the inference F 503, and the pseudo attacker S 601, with sufficient accuracy, can be obtained.

[Inference]

As shown in FIG. 7, when determining that the input data is data not used to train the inference F (NoM), the pseudo attacker S 601 outputs an inference result for the input data by the inference F 503, whereas when determining that the input data is data used to train the inference F (Mem), the pseudo attacker S 601 outputs an inference result for the input data by the inference H 502.

As a result, in the third example embodiment, it is also not possible to distinguish whether or not the input, which is the source of an inference result, is data used for training, from an output of the pseudo attacker S that uses the inference H 502 or F 503 depending on the input data.

As described above, the accurate parameter $\theta_1$ is set in the inference F 503 trained using the training data S1 without consideration to security (the defense performance against MI attacks). Meanwhile, the inference H 502 has the parameter $\theta_2$ that can ensure a security of the training data S1 (the defense performance against MI attacks) when the training data S1 is inputted thereto. Therefore, according to the present example embodiment, it is possible to build an inference system with improved accuracy and security (the defense performance against MI attacks).

Therefore, it also becomes difficult to distinguish the inference results of the following (a) to (c) in the present example embodiment.

(a) Output from the inference H 502 when the training data S1 used for training is inputted thereto.
(b) Output from the inference F 503 when the training data S0 not used for training is inputted thereto.
(c) Output from the inference H 502 when the training data S0 not used for training is inputted thereto.

As described, according to the present example embodiment, also achieved is the advantage over the method of NPL 3 in which inference accuracy and security are in a trade-off relationship.

While each example embodiment of the present invention has been described, it is to be understood that the present invention is not limited to the example embodiments above and that further modifications, replacements, and adjustments may be added without departing from the basic technical concept of the present invention. For instance, the system configuration, the configuration of each element, and the expression of the data shown in each drawing are examples to facilitate understanding of the present invention and are not limited to the configurations shown in the drawings.

Figure 11:
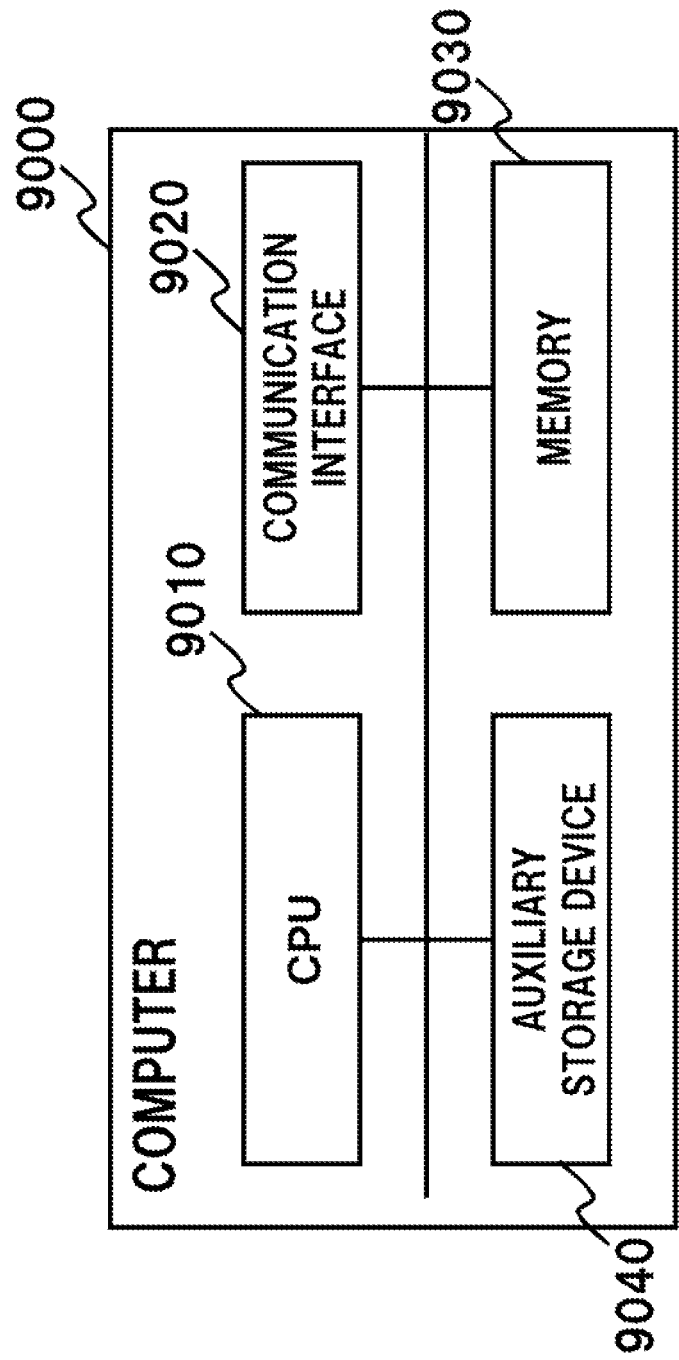
FIG. 11 is a drawing showing the configuration of a computer constituting a machine learning system according to the present invention.

The procedures described in the example embodiments above can be implemented by a program causing a computer (9000 in FIG. 11) that functions as a machine learning system to achieve the functions of the system. Such a computer is illustrated in a configuration comprising a CPU (Central Processing Unit) 9010, a communication interface 9020, a memory 9030, and an auxiliary storage device 9040 shown in FIG. 11. In other words, the CPU 9010 in FIG. 11 may execute a machine learning program or an encryption/decryption program to update each computation parameter held in the auxiliary storage device 9040 thereof.

In other words, the learning processing of the machine learning system or the inference processing obtained thereby described in the example embodiments above can be realized by a computer program causing a processor provided in these apparatuses to execute each processing described above using the hardware thereof.

Further, the disclosure of each Patent Literature and NPL cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims) and based on the basic technical concept thereof. Further, it is possible to variously combine or select (or partially remove) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literatures cited above as necessary, in combination with the matters described herein, as part of the disclosure of the present invention in accordance with the object of the present invention shall be considered to be included in the disclosed matters of the present application.

The present disclosure may be expressed as following modes, but not restricted thereto.

[Mode 1]
The machine learning method set forth as the first aspect.

[Mode 2]
The machine learning method according to Mode 1, wherein in the second learning phase, the defender u trains the parameter $\tau$ of the defender u so that
an output obtained by inputting the second dataset to the learning model f; and
an output obtained by inputting the first dataset to the learning model f and further inputting the output thereof to the defender u cannot be distinguished.

[Mode 3]
The machine learning method according to Mode 1 or 2, wherein
the second learning phase further includes:
a step of training the parameter T of the defender u so that a result obtained by inputting data of an arbitrary dataset to the learning model f and data of the arbitrary dataset are inputted to the defender u, and the defender u outputs an inference result from the data of the arbitrary dataset as it is.

[Mode 4]
The machine learning method according to Mode 3, wherein a dataset that does not include the data of the first dataset is used as the dataset used in the step.

[Mode 5]
The machine learning method according to Mode 3 or 4, wherein in the step,
the parameter τ of the defender u is trained so that an output y obtained by inputting the data of the second dataset to the learning model f and an output y' obtained by inputting the output y to the defender u are the same.

[Mode 6]
The machine learning method according to any one of Modes 1 to 5, wherein the defender u performs predetermined defensive processing on data outputted from the learning model f in an inference phase.

[Mode 7]
A machine learning method, comprising:
a first learning phase in which a machine learning is performed using a first dataset with a teacher label as training data to create a learning model F having a parameter $\theta_1$;
a second learning phase in which
the first dataset or a second dataset is randomly selected;
when the first dataset is selected, a result obtained by inputting the first dataset to a learning model H having a parameter $\theta_2$ is inputted to a predetermined discriminator D as an input data, and a machine learning is performed using a result obtained by having the predetermined discriminator D discriminate whether the input data belongs to the first dataset or the second dataset to train a parameter of the predetermined discriminator D and the parameter $\theta_2$ of the learning model H; and
when the second dataset is selected, a result obtained by inputting the second dataset to the learning model F having the parameter $\theta_1$ is inputted to the predetermined discriminator D as an input data, and a machine learning is performed using a result obtained by having the predetermined discriminator D discriminate whether the input data belongs to the first dataset or the second dataset to train the parameter of the predetermined discriminator D; and
a third learning phase in which
the first dataset or the second dataset is randomly selected;
when the first dataset is selected, the first dataset is inputted to the learning model H, and when the second dataset is selected, the second dataset is inputted to the learning model F; and
a parameter of a predetermined pseudo attacker S is trained by using inference results outputted from the learning model H and the learning model F and respective data inputted to the learning model H and the learning model F, the inference results and the respective data being inputted to the predetermined pseudo attacker S.

[Mode 8]
The machine learning system as set forth as the second aspect.

[Mode 9]
The program recording medium as set forth as the third aspect.

REFERENCE SIGNS LIST 10, 10a, 10b: machine learning system
100: control part
101, 301: parameter learning part
201, 401, 501: data selection part
202a, 202b: inference f
203: defender u updating part
204: discriminator h updating part
402: inference H updating part
403, 503: inference F
404: discriminator D updating part
502: inference H
601: pseudo attacker S
S0, S1, S2: training data
9000: computer
9010: CPU
9020: communication interface
9030: memory
9040: auxiliary storage device

What is claimed is:

1. A machine learning method performed by a computer and comprising:
a first learning phase in which a machine learning is performed using first dataset with a teacher label as training data to create a learning model f having a parameter θ, wherein the teacher label means that the first dataset provides correct answer data to which the learning model f refers during learning; and
a second learning phase in which
the first dataset or a second dataset is randomly selected;
a first result obtained by inputting data of the first dataset and the second dataset to the learning model f is inputted to a discriminator h having a parameter w as an input data;
a machine learning is performed using a second result and a ground truth data to train the parameter ω of the discriminator h, the second result being obtained by having the discriminator h discriminate whether the input data belongs to the first dataset or the second dataset; and
when the first dataset is selected, a result obtained by inputting the data of the first dataset to the learning model f is inputted to a defender u having a parameter τ that modifies an output of the learning model f to train the parameter τ of the defender u by using an output of the discriminator h that has passed through the defender u.

2. The machine learning method according to claim 1, wherein
in the second learning phase, the defender u trains the parameter τ of the defender u so that
an output obtained by inputting the second dataset to the learning model f; and
an output obtained by inputting the first dataset to the learning model f and further inputting the output thereof to the defender u cannot be distinguished.

3. The machine learning method according to claim 2, wherein
in the second learning phase, further
the parameter τ of the defender u is trained so that a result obtained by inputting data of an arbitrary dataset to the learning model f and data of the arbitrary dataset are inputted to the defender u, and the defender u outputs an inference result from the data of the arbitrary dataset as it is.

4. The machine learning method according to claim 2, wherein the defender u performs predetermined defensive processing on data outputted from the learning model f in an inference phase.

5. The machine learning method according to claim 1, wherein
in the second learning phase, further
the parameter τ of the defender u is trained so that a result obtained by inputting data of an arbitrary dataset to the learning model f and data of the arbitrary dataset are inputted to the defender u, and the defender u outputs an inference result from the data of the arbitrary dataset as it is.

6. The machine learning method according to claim 5, wherein a dataset that does not include the data of the first dataset is used as the dataset used in the training the parameter τ of the defender u.

7. The machine learning method according to claim 6, wherein in the training the parameter τ of the defender u, the parameter τ of the defender u is trained so that an output y obtained by inputting the data of the second dataset to the learning model f and an output y' obtained by inputting the output y to the defender u are the same.

8. The machine learning method according to claim 6, wherein the defender u performs predetermined defensive processing on data outputted from the learning model f in an inference phase.

9. The machine learning method according to claim 5, wherein in the training the parameter τ of the defender u, the parameter τ of the defender u is trained so that an output y obtained by inputting the data of the second dataset to the learning model f and an output y' obtained by inputting the output y to the defender u are the same.

10. The machine learning method according to claim 9, wherein the defender u performs predetermined defensive processing on data outputted from the learning model f in an inference phase.

11. The machine learning method according to claim 5, wherein the defender u performs predetermined defensive processing on data outputted from the learning model f in an inference phase.

12. The machine learning method according to claim 1, wherein the defender u performs predetermined defensive processing on data outputted from the learning model f in an inference phase.

13. A machine learning method performed by a computer and comprising:
a first learning phase in which a machine learning is performed using a first dataset with a teacher label as training data to create a learning model F having a parameter $\theta_1$, wherein the teacher label means that the first dataset provides correct answer data to which the learning model F refers during learning;
a second learning phase in which
the first dataset or a second dataset is randomly selected;
when the first dataset is selected, a result obtained by inputting the first dataset to a learning model H having a parameter $\theta_2$ is inputted to a predetermined discriminator D as an input data, and a machine learning is performed using a result obtained by having the predetermined discriminator D discriminate whether the input data belongs to the first dataset or the second dataset to train a parameter of the predetermined discriminator D and the parameter $\theta_2$ of the learning model H; and
when the second dataset is selected, a result obtained by inputting the second dataset to the learning model F having the parameter $\theta_1$ is inputted to the predetermined discriminator D as an input data, and a machine learning is performed using a result obtained by having the predetermined discriminator D discriminate whether the input data belongs to the first dataset or the second dataset to train the parameter of the predetermined discriminator D; and
a third learning phase in which
the first dataset or the second dataset is randomly selected;
when the first dataset is selected, the first dataset is inputted to the learning model H, and when the second dataset is selected, the second dataset is inputted to the learning model F; and
a parameter of a predetermined pseudo attacker S is trained by using inference results outputted from the learning model H and the learning model F and respective data inputted to the learning model H and the learning model F, the inference results and the respective data being inputted to the predetermined pseudo attacker S.

14. A machine learning system comprising:
a memory storing instructions; and
a processor configured to execute the instructions to implement;
a first learning phase in which a machine learning is performed using a first dataset with a teacher label as training data to create a learning model f having a parameter θ, wherein the teacher label means that the first dataset provides correct answer data to which the learning model f refers during learning; and
a second learning phase in which
the first dataset or a second dataset is randomly selected;
a first result obtained by inputting data of the first dataset and the second dataset to the learning model f is inputted to a discriminator h having a parameter ω as an input data;
a machine learning is performed using a second result and a ground truth data to train the parameter ω of the discriminator h, the second result being obtained by having the discriminator h discriminate whether the input data belongs to the first dataset or the second dataset; and
when the first dataset is selected, a result obtained by inputting the data of the first dataset to the learning model f is inputted to a defender u having a parameter τ that modifies an output of the learning model f to train the parameter τ of the defender u by using an output of the discriminator h that has passed through the defender u.

15. The machine learning system according to claim 14, wherein
in the second learning phase, the defender u trains the parameter τ of the defender u so that
an output obtained by inputting the second dataset to the learning model f; and
an output obtained by inputting the first dataset to the learning model f and further inputting the output thereof to the defender u cannot be distinguished.

16. The machine learning system according to claim 14, wherein
in the second learning phase, further
the parameter τ of the defender u is trained so that a result obtained by inputting data of an arbitrary dataset to the learning model f and data of the arbitrary dataset are inputted to the defender u, and the defender u outputs an inference result from the data of the arbitrary dataset as it is.

17. The machine learning system according to claim 16, wherein a dataset that does not include the data of the first dataset is used as the dataset used in the training the parameter τ of the defender u.

18. The machine learning system according to claim 16, wherein in the training the parameter τ of the defender u, the parameter τ of the defender u is trained so that an output y obtained by inputting the data of the second dataset to the learning model f and an output y' obtained by inputting the output y to the defender u are the same.

19. The machine learning system according to claim 14, wherein the defender u performs predetermined defensive processing on data outputted from the learning model f in an inference phase.

* * * * *